(12) United States Patent
Ritchey et al.

(10) Patent No.: US 10,335,877 B2
(45) Date of Patent: Jul. 2, 2019

(54) MULTILAYER BRAZE TAPE

(71) Applicant: Rolls-Royce Corporation, Indianapolis, IN (US)

(72) Inventors: Andrew James Ritchey, Lafayette, IN (US); Sean E. Landwehr, Avon, IN (US); Scott Nelson, Carmel, IN (US); Sungbo Shim, Irivne, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 382 days.

(21) Appl. No.: 15/002,182

(22) Filed: Jan. 20, 2016

(65) Prior Publication Data

US 2016/0207129 A1 Jul. 21, 2016

Related U.S. Application Data

(60) Provisional application No. 62/105,953, filed on Jan. 21, 2015.

(51) Int. Cl.
| | | |
|---|---|---|
| *B23K 1/00* | (2006.01) | |
| *B23K 1/19* | (2006.01) | |
| *B23K 35/02* | (2006.01) | |
| *B23K 35/24* | (2006.01) | |
| *B23K 1/005* | (2006.01) | |
| *B23K 1/20* | (2006.01) | |
| *B23K 103/18* | (2006.01) | |
| *B23K 103/00* | (2006.01) | |

(52) U.S. Cl.
CPC .............. *B23K 1/0008* (2013.01); *B23K 1/00* (2013.01); *B23K 1/0056* (2013.01); *B23K 1/19* (2013.01); *B23K 1/20* (2013.01); *B23K 35/0238* (2013.01); *B23K 35/24* (2013.01); *B23K 2103/18* (2018.08); *B23K 2103/52* (2018.08)

(58) Field of Classification Search
None
See application file for complete search history.

(56) References Cited

U.S. PATENT DOCUMENTS

| | | | |
|---|---|---|---|
| 4,961,529 A | 10/1990 | Gottselig et al. | |
| 5,336,350 A * | 8/1994 | Singh ............... | C04B 35/565 156/155 |

(Continued)

FOREIGN PATENT DOCUMENTS

| | | |
|---|---|---|
| WO | 2011029785 A1 | 3/2011 |
| WO | 2011113760 A1 | 9/2011 |
| WO | 2014013166 A1 | 1/2014 |

OTHER PUBLICATIONS

U.S. Appl. No. 16/137,897, filed Sep. 21, 2018, by Nelson et al.

*Primary Examiner* — Robert T Butcher
(74) *Attorney, Agent, or Firm* — Shumaker & Sieffert, P.A.

(57) ABSTRACT

A method may include positioning a multilayer braze tape at a joint between a first part comprising a ceramic or CMC and a second part comprising at least one of a ceramic, a CMC, a metal, or an alloy. The multilayer braze tape may include at least one layer comprising a silicon-containing braze material and at least one layer comprising a reinforcement material. The method also may include applying pressure to compress the multilayer braze tape between the first part and the second part, and heating the multilayer braze tape to melt the silicon-containing braze material and join the first part and the second part.

14 Claims, 5 Drawing Sheets

(56) References Cited

U.S. PATENT DOCUMENTS

| | | |
|---|---|---|
| 5,666,643 A | 9/1997 | Chesnes et al. |
| 5,836,505 A | 11/1998 | Chaumat et al. |
| 5,975,407 A | 11/1999 | Gasse et al. |
| 6,991,856 B2 | 1/2006 | Weihs et al. |
| 7,318,547 B2 | 1/2008 | Gasse |
| 7,946,467 B2 | 5/2011 | Cretegny |
| 8,763,883 B2 | 7/2014 | Chaumat et al. |
| 8,974,891 B2 | 3/2015 | Riedell |
| 9,056,369 B2 | 6/2015 | Chaumat et al. |
| 9,403,240 B2 | 8/2016 | Revel et al. |
| 2010/0075160 A1 | 3/2010 | Chaumat et al. |
| 2011/0033717 A1 | 2/2011 | Peterson et al. |
| 2012/0171430 A1 | 7/2012 | Riedell |
| 2012/0177488 A1 | 7/2012 | Corman |
| 2013/0075039 A1 | 3/2013 | Herderick et al. |
| 2016/0207129 A1 | 7/2016 | Ritchey et al. |
| 2016/0244374 A1 | 8/2016 | Nelson et al. |
| 2016/0325368 A1 | 11/2016 | Landwehr et al. |

\* cited by examiner

MULTILAYER BRAZE TAPE

This application claims the benefit of U.S. Provisional Application No. 62/105,953 filed Jan. 21, 2015, the entire content which is incorporated herein by reference.

TECHNICAL FIELD

The present disclosure generally relates to brazes for joining ceramic or ceramic matrix composite components.

BACKGROUND

Some articles formed from ceramics or ceramic matrix composites (CMCs), alone or in combination with a metal or alloy, are more easily formed out of multiple parts. For example, the geometry of the article may be complex and may be difficult to form in a single piece. However, joining multiple parts, where at least one of the parts is formed of a ceramic or a CMC may be difficult, as the melting point of the ceramic or CMC may be very high, or the ceramic or CMC may decompose before melting.

SUMMARY

In some examples, the disclosure describes a method including positioning a multilayer braze tape at a joint between a first part comprising a ceramic or CMC and a second part comprising at least one of a ceramic, a CMC, a metal, or an alloy. The multilayer braze tape may include at least one layer comprising a silicon-containing braze material and at least one layer comprising a reinforcement material. The method also may include applying pressure to compress the multilayer braze tape between the first part and the second part, and heating the multilayer braze tape to melt the silicon-containing braze material and join the first part and the second part.

In some examples, the disclosure describes an assembly including a first part including a ceramic or CMC and a second part including at least one of a ceramic, a CMC, a metal, or an alloy. The first and second parts may define a joint between adjacent portions of the first part and the second part. The assembly also may include a multilayer braze tape positioned at the joint between the adjacent portions of the first part and the second part. The multilayer braze tape may include at least one layer comprising a silicon-containing braze material and at least one layer comprising a reinforcement material.

In some examples, the disclosure describes a multilayer braze tape including at least one layer comprising a silicon-containing braze material and at least one layer comprising a reinforcement material.

In some examples, the disclosure describes a method including forming at least one layer comprising a silicon-containing braze material using at least one of tape casting, slurry casting, or gel casting; forming at least one layer comprising a reinforcement material comprising silicon carbide using at least one of tape casting, slurry casting, or gel casting; and assembling the at least one layer comprising the silicon-containing braze material and the at least one layer comprising the reinforcement material to form a multilayer braze tape.

The details of one or more examples are set forth in the accompanying drawings and the description below. Other features, objects, and advantages will be apparent from the description and drawings, and from the claims.

DETAILED DESCRIPTION

Figure 1:
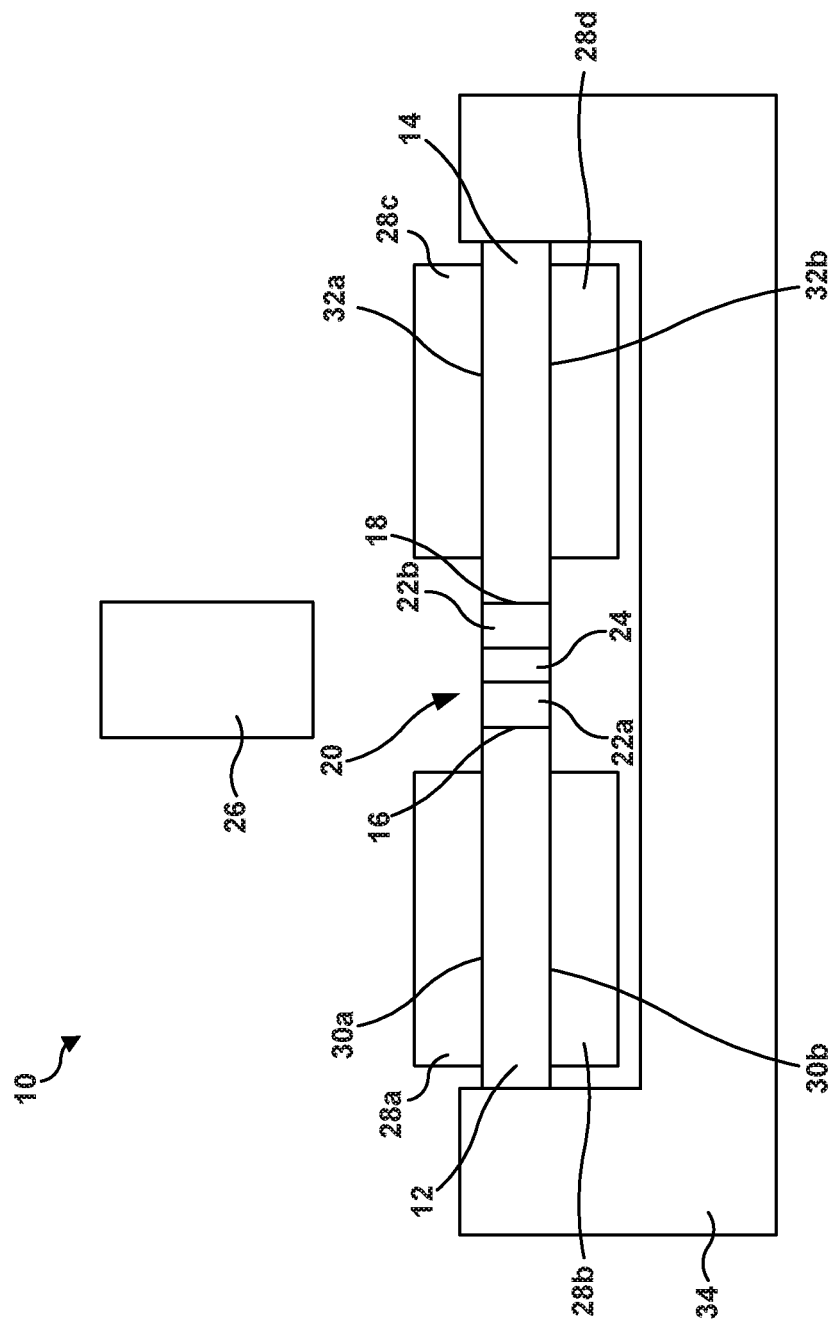
FIG. 1 is a conceptual diagram illustrating an example assembly for joining a first part and a second part using a multilayer braze tape.

The disclosure describes assemblies, systems, and techniques for forming a joint between a first part including a ceramic or a ceramic matrix composite (CMC) and a second part including at least one of a ceramic, a CMC part, a metal, or an alloy using a multilayer braze tape. As described above, joining multiple parts, where at least one of the parts is formed of a ceramic or a CMC may be difficult, as the melting point of the ceramic or CMC may be very high, or the ceramic or CMC may decompose before melting. Other brazing techniques may utilize a paste or a putty braze material, and may utilize excess braze material. The excess braze material may flow out of the joint unless a chemical or mechanical stop is used to contain the braze material. This may complicate assembly and increase time used to form a component.

A multilayer braze tape may include all constituents used to join the first part and the second part. For example, a multilayer braze tape may include at least one layer including a reinforcement material and at least one layer including a braze material. By utilizing a multilayer braze tape, the constituents of the braze may not need to flow as far along the joint to join the first ceramic or CMC part and the second ceramic or CMC part (e.g., compared to a braze paste or putty). This may allow use of a shorting time for brazing, reducing the amount of time the first part and the second part are exposed to elevated temperatures. In some examples, this may reduce effects that the elevated temperatures may have on the first part, the second part, or both.

In some examples, the multilayer braze tape may include at least one layer including a reinforcement material and at least one layer including a silicon-containing braze material. The at least one layer including the silicon-containing braze material may include silicon particulates, silicon alloy particulates, or silicon particulates and alloy constituent particulates. The some examples, the particulates may be disposed in a binder, such as an organic binder system. Upon heating of the multilayer braze tape, the organic binder system may decompose to release carbon. The carbon may react with the silicon to form silicon carbide. The silicon carbide may harden and form a matrix around the reinforcement material, joining the first part and the second part. In some examples, the reinforcement material includes silicon carbide. By including both a matrix and a reinforcement material, the joint between the first part and the second part may have improved mechanical properties compared to a joint including only silicon carbide matrix phase. In some examples, at least one of the at least one layer including reinforcement material or the at least one layer including a silicon-containing braze material may additionally include graphite, carbon black, diamond, or the like. The graphite, carbon black, diamond or the like may react with the silicon to form silicon carbide.

In some examples, the multilayer braze tape may be formed using at least one of slurry casting, tape casting, or gel casting. In some examples, individual layers of the multilayer tapes may be formed separately, then multiple layers may be assembled to form the multilayer braze tape. In other examples, one layer may be casted on another previously casted layer to form the multilayer braze tape.

FIG. 1 is a conceptual diagram illustrating an example assembly 10 for joining a first part 12 including a ceramic or a ceramic matrix composite (CMC) and a second part 14 including at least one of a ceramic, a CMC, a metal, or an alloy using a multilayer braze tape 20. Assembly 10 includes first part 12, second part 14, and multilayer braze tape 20. Assembly 10 also optionally includes one or more of a braze heat source 26, at least one part heat source 28a-28d, and a clamp 34.

First part 12 and second part 14 may be parts that form a component of a high temperature mechanical system. For example, first part 12 and second part 14 may together be a blade track, an airfoil, a blade, a combustion chamber liner, or the like, of a gas turbine engine.

First part 12 includes a ceramic or a CMC. In some examples, first part 12 may include a ceramic or CMC that includes Si. In some examples, first part 12 may include a silicon based material, such as silicon based ceramic or a silicon based CMC.

In some examples in which first part 12 includes a ceramic, the ceramic may be substantially homogeneous. In some examples, first part 12 that includes a ceramic includes, for example, silicon carbide (SiC), transition metal carbides and silicides (e.g. WC, $Mo_2C$, TiC, $MoSi_2$, $NbSi_2$, $TiSi_2$), or the like.

In examples in which first part 12 includes a CMC, first part 12 includes a matrix material and a reinforcement material. The matrix material includes a ceramic material, such as, for example, silicon or SiC. The CMC further includes a continuous or discontinuous reinforcement material. For example, the reinforcement material may include discontinuous whiskers, platelets, fibers, or particulates. As other examples, the reinforcement material may include a continuous monofilament or multifilament weave. In some examples, the reinforcement material may include SiC, C or the like. In some examples, first part 12 includes a SiC—SiC ceramic matrix composite.

In some examples, second part 14 may include a ceramic or a CMC. Second part 14 may include any of the ceramics or any of the CMCs described above with respect to first part 12. In some examples, first part 12 and second part 12 may be formed of the same material (ceramic or CMC). In other examples, first part 12 may be formed of a different ceramic or CMC than second part 14. In other examples, second part 14 may include a metal or an alloy.

Although FIG. 1 illustrates first part 12 and second part 14 as each defining a simple, substantially rectangular geometry, in other examples, first part 12, second part 14, or both may define a more complex geometry, including simple or complex curves, overhangs, undercuts, or the like.

First part 12 defines at least one joint surface 16. Similarly, second part 14 defines at least one joint surface 18. In some examples, joint surfaces 16 and 18 may define complementary shapes. FIG. 1 illustrates joint surfaces 16 and 18 as substantially flat surfaces. In other examples, joint surfaces 16 and 18 may define other, more complex shapes, including, for example, simple or complex curves, overhangs, undercuts, or the like.

First part 12 and second part 14 are positioned such that joint surfaces 16 and 18 are adjacent to each other and define a joint or joint location at which multilayer braze tape 20 is positioned. The joint may include any kind of joint, including, for example, at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joint surfaces 16 and 18 may have any corresponding geometries to define the surfaces of the joint. For example, for a mortise and tenon joint, first part 12 may define a mortise (a cavity) and second part 14 may define a tenon (a projection that inserts into the mortise), or vice versa. As another example, for a splice joint, first part 12 may define a half lap, a bevel lap, or the like, and second part 14 may define a complementary half lap bevel lap, or the like.

Disposed at the joint is a multilayer braze tape 20. For example, multilayer braze tape 20 may contact joint surfaces 16 and 18. In some examples, multilayer braze tape 20 may define a shape that substantially conforms (e.g., conforms or nearly conforms) to a shape of the joint. For example, if the joint is a mortise and tenon joint, multilayer braze tape 20 may define a shape so that multilayer braze tape 20 contacts one or more surfaces of the mortise (e.g., all surface of the mortise) that would otherwise be contacted by respective surfaces of the tenon. For other joint geometries, multilayer braze tape 20 may define similarly corresponding shapes. In some examples, instead of a single multilayer braze tape 20 being at the joint, multiple multilayer braze tapes 20 may be positioned at surfaces of the joint. For example, multiple multilayer braze tapes 20 may allow more complete covering of joint surfaces 16 and 18 when joint surfaces 16 define complex shapes, may allow easier assembly, or both.

Multilayer braze tape 20 includes at least one layer including a silicon-containing braze material and at least one layer including a reinforcement material. In the example illustrated in FIG. 1, multilayer braze tape 20 includes first and second layers 22a and 22b including a silicon-containing braze material and a third layer 24 including a reinforcement material, and third layer 24 is between first and second layers 22a and 22b. In other examples, e.g., the example illustrated in FIG. 2, multilayer braze tape 20 may include a plurality of layers including a silicon-containing braze material and a plurality of layers including a reinforcement material.

First and second layers 22a and 22b (collectively, "first and second layers 22") each include a silicon-containing braze material. The silicon-containing braze material may include, for example, silicon metal, a silicon alloy, or silicon metal and an alloying element. In some examples, the silicon alloy may include silicon metal alloyed with transition metals, transition metal carbides, transition metal borides, transition metal silicides, or mixtures thereof. Similarly, the alloying element may include at least one of titanium, boron, carbon, or the like. The alloying element may modify the melting temperature of silicon, modify the viscosity or wetting characteristics of the melted alloy compared to molten silicon, or the like. The silicon metal, the silicon alloy, or the silicon metal and the alloying element may be present in the silicon-containing braze material as a particulate.

In some examples, first and second layers 22 also may include a binder, which keeps the silicon-containing braze material in the respective layers 22. In some examples, the binder may include a carbon-yielding organic binder system for example furan derived binders. The carbon-yielding organic binder system may be formed, for example, during slurry casting, tape casting, or gel casting of the respective layers 22.

In some examples, at least one of first and second layers 22 may additionally include graphite, carbon black, diamond, or the like. The graphite, carbon black, diamond or the like may react with the silicon (e.g., silicon metal) to form silicon carbide.

Third layer 24 includes a reinforcement phase. The reinforcement phase may provide structural reinforcement contributing to mechanical properties of the joint. In some examples, the reinforcement phase may include a similar material to the reinforcement in first part 12, second part 14 (if second part 14 includes a CMC), or both (if first part 12 and second part 14 both include a reinforcement). For example, third layer 24 may include a reinforcement phase including silicon carbide. The reinforcement phase in third layer 24 may include, for example, particulates, chopped fibers, woven fibers, unidirectional fibers, or the like. The reinforcement phase may remain in the joint during and after reaction of silicon in first and second layers 22 with carbon (e.g., from the carbon-yielding organic binder system), forming a reinforcement phase in the matrix of silicon carbide formed by through the reaction of the silicon and carbon.

In some examples, third layer 24 also may include a binder, which keeps the reinforcement material in third layer 24. In some examples, the binder may include a carbon-yielding organic binder system for example furan derived binders. The carbon-yielding organic binder system may be formed, for example, during slurry casting, tape casting, or gel casting of the third layer 24. In some examples, the binder in third layer 24 may be the same as the binder in first and second layers 22; in other examples, the binder in third layer 24 may be different than the binder in first and second layers 22.

In some examples, third layer 24 may additionally include graphite, carbon black, diamond, or the like. The graphite, carbon black, diamond or the like may react with the silicon (e.g., silicon metal) from first and second layers 22a and 22b to form silicon carbide as the silicon from first and second layers 22a and 22b infiltrates third layer 24.

In some examples, multilayer braze tape 20 may be formed by a casting technique, such as tape casting, slurry casting, or gel casting the layers of multilayer braze tape 20. For example, each of the layers of multilayer braze tape 20 may be separately casted, then joined to form multilayer braze tape 20. As another example, first layer 22a may be casted, second layer 24 may be casted on first layer, and third layer 22b may be casted on second layer 24. Some example techniques for forming multilayer braze tape 20 will be described below in further detail.

Assembly 10 also may include at least one braze heat source 26. The at least one braze heat source 26 may be positioned adjacent to the location of the joint between first part 12 and second part 14. The at least one braze heat source 26 may be configured to locally heat multilayer braze tape 20 directly, indirectly, or both. For example, at least one braze heat source 26 may be configured to heat substantially only multilayer braze tape 20, while not directly heating first part 12 or second part 14. In some examples, at least one braze heat source 26 may include a laser-based heat source, an inductive heat source, a tungsten inert gas (TIG) welding heat source, or the like.

The at least one braze heat source 26 may be configured to heat multilayer braze tape 20 to a temperature above a melting temperature of the silicon or silicon alloy in first and second layers 22. For example, elemental silicon metal may melt at a temperature of about 1,414° C. Some silicon alloys may melt at lower temperatures than this. In some examples, at least one braze heat source 26 may be configured to heat multilayer braze tape 20 to a temperature between about 1327° C. and about 1427° C.

Optionally, assembly 10 also may include at least one part heat source 28 configured and positioned to preheat at least one of first part 12 or second part 14. In some examples, without preheating at least one of first part 12 or second part 14, the at least one of first part 12 or second part 14 may be susceptible to cracking due to rapid heating of portions of the at least one of the first part 12 or second part 14 adjacent to the joint during heating of multilayer braze tape 20. In some examples, assembly 10 may omit at least one part heat source 28.

In the example illustrated in FIG. 1, first part heat source 28a is positioned adjacent to a first surface 30a of first part 12 and second part heat source 28b is positioned adjacent to second surface 30b of first part 12. Similarly, third part heat source 28c is positioned adjacent to first surface 32a of second part 14 and fourth heat source 28d is positioned adjacent to second surface 32b of second part 14. In other examples, assembly 10 may include more or fewer heat sources 28, e.g., only one heat source adjacent to each of first part 12 and second part 14. Each of heat sources 28 may be an inductive, conductive, or radiative heat source. Further, each of heat sources 28 may be the same, or at least one of heat sources 28 may be different than others of heat sources 28.

In some examples, heat sources 28 may heat first part 12, second part 14, or both to a temperature of between about 900° C. and about 1,000° C. prior to or during heating of multilayer braze tape 20.

Assembly 10 also includes a mechanism 34 that applies a force to first part 12, second part 14, or both to compress multilayer braze tape 20 between first joint surface 16 and second joint surface 18. In the example illustrated in FIG. 1, mechanism 34 includes a clamp. In some examples, mechanism 34 may be controlled to control the force applied to compress multilayer braze tape 20. For example, the force may be controlled using a spring system, and screw system, a hydraulic system, a pneumatic system, or the like. The compressive force applied to multilayer braze tape 20 may evacuate porosity from multilayer braze tape 20, reducing porosity of the formed joint.

As shown in FIG. 1, to join first part 12 and second part 14, multilayer braze tape 20 may be positioned between joint surfaces 16 and 18. Optionally, first part 12 and second part 14 may be preheated using at least one heat source 28. At least one braze heat source 26 may be used to heat multilayer braze tape 20 to a temperature above a melting temperature of the silicon metal, silicon alloy, or silicon metal and alloying element in first and second layers 22. Mechanism 34 may apply a force to first part 12, second part 14, or both to compress multilayer braze tape 20 between first joint surface 16 and second joint surface 18 while at least one braze heat source 26 heats multilayer braze tape 20. Silicon (e.g., silicon metal) in first and second layers 22 may react with carbon in multilayer braze tape 20 to form a matrix including silicon carbide. The matrix including silicon carbide may surround the reinforcement material in second layer 24 and harden, forming a CMC joint between first part 12 and second part 14. Because the silicon-containing braze material is present throughout first and second layers 22 and multilayer braze tape is located at the joint between first part 12 and second part 14, molten silicon or molten silicon alloy may not need to flow as far as if the molten silicon or molten silicon alloy were introduced from outside the joint during the brazing technique. This may increase the speed of the brazing technique, reducing a time for which first part 12 and second part 14 are exposed to elevated temperature, which may reduce the impact of the elevated temperatures on first part 12 and second part 14.

Figure 2:
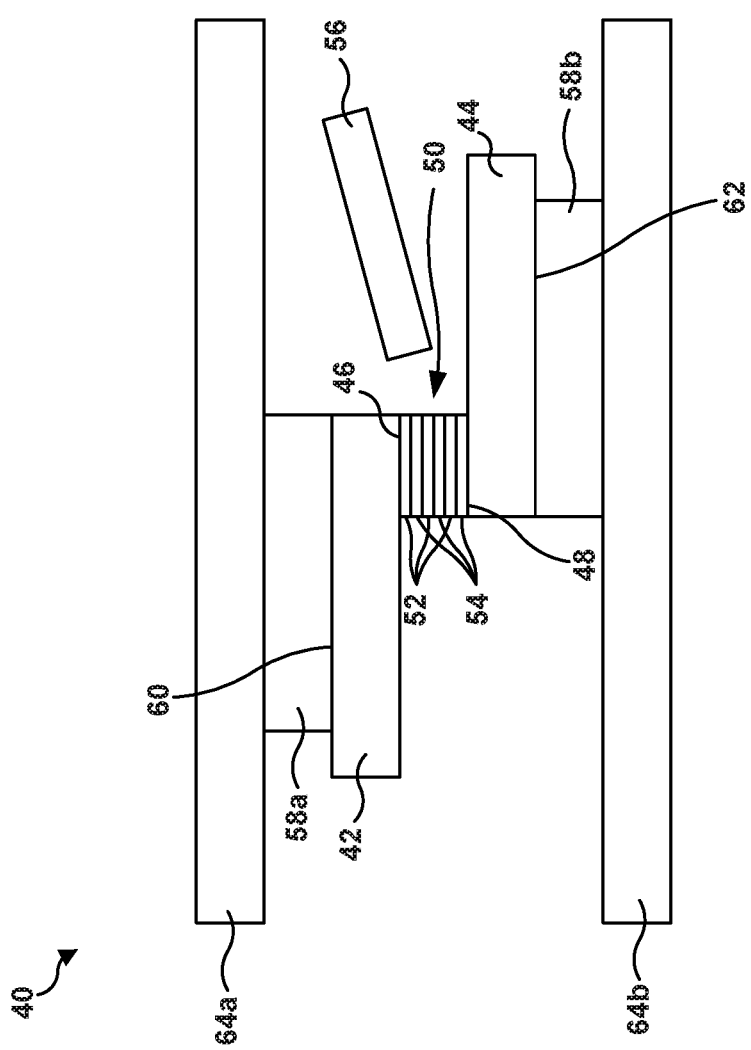
FIG. 2 is a conceptual diagram illustrating another example assembly for joining a first part and a second part using a multilayer braze tape.

FIG. 1 illustrates an example assembly 40 that may be used to form some types of braze joints using multilayer braze tape 20. FIG. 2 is a conceptual diagram illustrating another example assembly 40 for joining a first part 42 and a second part 44 using a multilayer braze tape 50. Some components of assembly 40 may be similar to or substantially the same as corresponding components of assembly 10 of FIG. 1. For example, first part 42, second part 44, at least one braze heat source 56, and at least one part heat source 58 may be similar to or substantially the same as first part 12, second part 14, at least one braze heat source 26, and at least one part heat source 28.

Unlike the example shown in FIG. 1, which illustrates a butt joint, the example shown in FIG. 2 illustrates a lap joint between first part 42 and second part 44. Thus, first joint surface 46 and second joint surface 48 are major surfaces of first part 42 and second part 44, respectively, and first part 42 overlaps second part 44 at the joint.

Also unlike the example shown in FIG. 1, multilayer braze tape 50 includes a plurality of first layers 52 and a plurality of second layers 54. In some examples, as shown in FIG. 2, respective layers of first layers 52 alternate with (or are interleaved with) respective layers of second layers 54. In the example illustrated in FIG. 2, one of first layers 52 is an outer layer on one side of multilayer braze tape 50, and one of second layers 54 is an outer layer on the other side of multilayer braze tape 50. In other examples, respective layers of first layers 52 may be outer layers on both sides of multilayer braze tape 50, or respective layers of second layers 54 may be outer layers on both sides of multilayer braze tape 50.

Each layer of first layers 52 may include a silicon-containing braze material. In some examples, each layer of first layers 52 includes a similar or substantially the same composition. In other examples, at least one layer of first layers 52 may include a different composition that at least one other layer of first layers 52. First layers 52 may include any of the compositions described above with respect to first and second layers 22.

Each layer of second layers 54 may include a reinforcement material. In some examples, each layer of second layers 54 includes a similar or substantially the same composition. In other examples, at least one layer of second layers 54 may include a different composition that at least one other layer of second layers 54. Second layers 54 may include any of the compositions described above with respect to third layer 24.

Assembly 40 also includes a hydraulic or pneumatic press that includes a first pressure plate 64a and a second pressure plate 64b (collectively, "pressure plates 64"). Pressure plates 64 may exert a force on part heating sources 58, which is transmitted through first and second parts 42 and 44 to multilayer braze tape 50 to compress multilayer braze tape 50 between first and second joint surfaces 46 and 48. The compressive force applied to multilayer braze tape 50 may evacuate porosity from multilayer braze tape 50, reducing porosity of the formed joint.

In other examples, rather than including a hydraulic or pneumatic press, pressure plates 64 may be part of a passive device that exerts a force on multilayer braze tape 50. For example, second pressure plate 64b may be a stationary surface, and first pressure plate 64a may be a weighted object, such that the weight of first pressure plate 64a compresses multilayer braze tape 50.

In some examples, pressure plates 64 may be thermally insulated from part heating sources 58, or may include an active cooling system, such as a liquid cooling system, to cool pressure plates 64. In some examples, part heating sources 58 may be incorporated into pressure plates 64 rather than being separate components.

Figure 3:
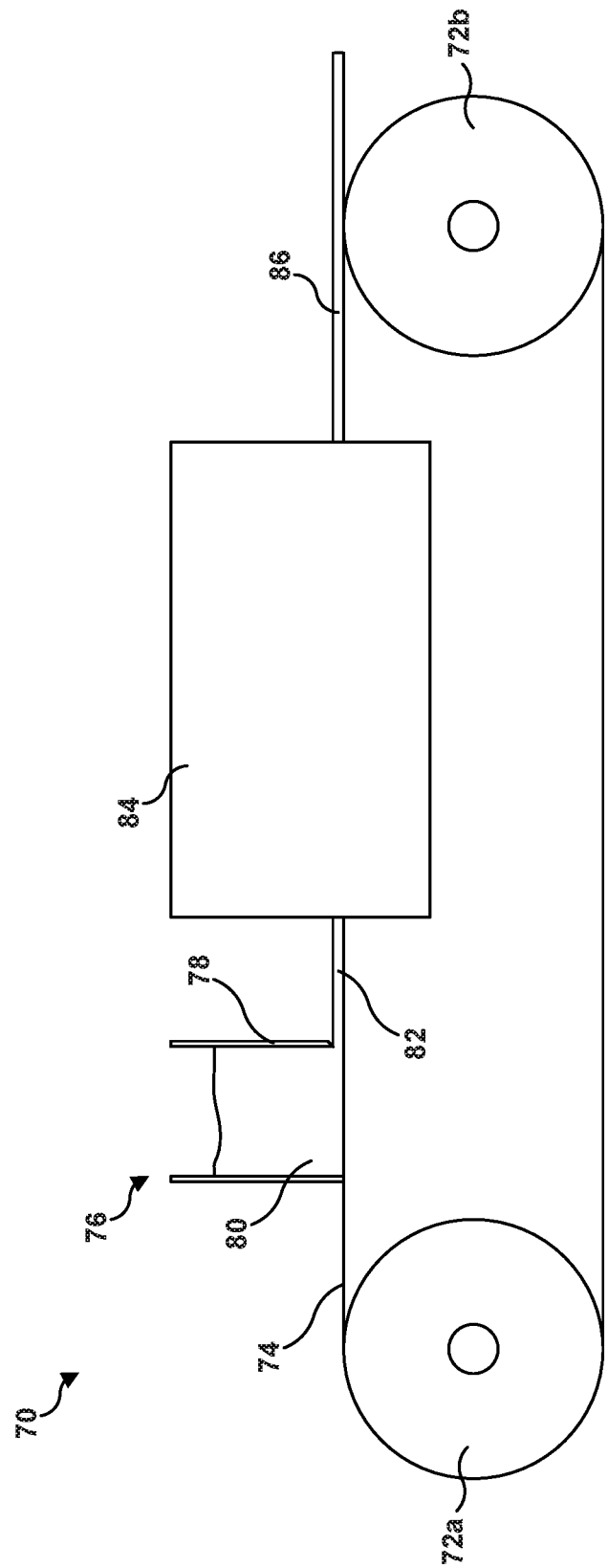
FIG. 3 is a conceptual diagram illustrating an example tape casting system.

In some examples, multilayer braze tape 20 or 50 may be formed using one or more casting techniques. For example, each layer of multilayer braze tape 20 or 50 may be formed using gel casting, slurry casting, or tape casting. FIG. 3 is a conceptual diagram illustrating an example tape casting system 70.

Tape casting system 70 includes a first roller 72a and a second roller 72b (collectively, "rollers 72"). A belt 74 is carried by and rotates about the rollers 72. In some examples, belt 74 may include a nonstick material that has low adhesion to the tape 86 formed using tape casting system 70, such that tape 86 may easily separate from belt 74 without damaging the tape 86. In other examples, belt 74 may carry a release liner on which the tape 86 is formed. The release liner may be formed of any film that has relatively low adhesion to the material from which the tape is formed 86.

Tape casting system 70 also includes a reservoir 76, which contains a slurry 80. One wall 78 of reservoir 76 is raised from belt 74 and defines a gap, which sets the thickness of the slurry layer 82 formed on belt 74.

The slurry may include components or precursors of tape 84 disposed in a solvent. For example, the slurry may include particles, a pre-gellant material, an optional gelation initiator or promoter, optional additives, and a solvent. The composition of the particles may depend on, for example, whether the tape 84 being formed includes a silicon-containing braze material or a reinforcement material. In examples in which tape 84 includes a silicon-containing braze material, the particles may include, for example, silicon metal, a silicon alloy, or silicon metal and an alloying element. In examples in which tape 84 includes a reinforcement material, the particles may include, for example, silicon nitride reinforcement (e.g., particulates, fibers, or the like).

The pre-gellant material may include any material that can be processed to form a gel-like network distribute and retain the particles within tape 84 as the tape 84 is subsequently processed. In this application, the term gel refers to a viscous, jelly-like colloid including a disperse phase of the particles.

In some examples, the pre-gellant material includes a polysaccharide such as, for example, methyl cellulose, carboxymethyl cellulose, hydroxypropyl methyl cellulose, gellan gum, xanthan gum, agarose, carrageenan, and mixtures and combinations thereof. In some examples, the slurry composition may optionally further include a gelation initiator or promoter such as a monovalent or a divalent salt.

In some examples, the pre-gellant material includes one or more gelation monomers which, when polymerized, form a gel. In various examples, the monomeric pre-gellant material may include, but are not limited to, acrylamides, acrylates, vinyls, allyls, and mixtures and combinations thereof. The gelation monomers may optionally include one, two, or more functional groups such as, for example, (meth) acryl, acrylamido, vinyl, allyl, and the like.

In some examples, the slurry can include an optional polymerization initiator to aid gelation of the pre-gellant material. The polymerization initiator may vary widely depending on the selected monomeric pre-gellant material, and in various example examples may include a peroxide, a persulfate, a perchlorate, an amine, an azo compound, and mixtures and combinations thereof.

The slurry also includes a solvent selected to disperse or dissolve the monomeric pre-gellant material and the optional polymerization initiator. In various examples, the solvent is aqueous (includes a major amount of water), or is water. Other solvents that can be used in the slurry include, but are not limited to, alcohols. In some examples, the slurry may optionally include less than about 10 weight percent (wt. %) of additives such as, for example, dispersants, binders, surfactants, pH adjustors, and the like.

In other examples, the slurry may include particles, a binder, and a solvent. For example, the slurry can include between about 40 vol. % and about 60 vol. % of particles, between about 10 vol. % and about 30 vol. % binder, optionally, up to about 40 vol. % additives, and between about 10 vol. % and about 20 vol. % of a solvent or mixture of solvents. As described above, in some examples, the binder may include an organic binder system.

In some examples, the slurry additionally may include graphite, carbon black, diamond, or the like.

In operation, as rollers 72 rotate, belt 74 is moved in a clockwise direction, moving under reservoir 76, and receiving the slurry 80. The gap between wall 78 and belt 74 defines the thickness of slurry layer 82 on belt. Slurry layer 82 is carried by belt 74 through a furnace 84, which dries slurry layer 82 to remove the solvent from slurry layer 82. In some examples, heat from furnace 84 also may facilitate the gelation reaction in slurry layer 82. Exiting from furnace 84 is a tape 86. Due to the presence of the binder or gel, tape 86 may be at least somewhat flexible. In some examples, tape 86 may be rolled on a roller for storage and/or transport.

In some examples, instead of including a single stage including a reservoir 76 and furnace 84, a tape casting system may include multiple stages, each stage including a respective reservoir and furnace. Thus, in a single process, multiple layers may be sequentially formed, each layer being dried before the next layer is formed. In this way, a single tape casting system may be used to form a multilayer braze tape 20 or 50.

In other examples, a tape may be formed using gel casting or slurry casting. In both gel casting and slurry casting, a slurry may be formed. The slurry in gel casting may include any of the components described above (e.g., any of the pre-gellant materials). Similarly, the slurry in slurry casting may include particles, a binder, a solvent, and optionally, additives. The slurry may be deposited in a mold, which may define the shape of the tape. The slurry then may be dried to remove the solvent, and, in the case of gel casting, gelled, either during or after the slurry is dried.

Figure 4:
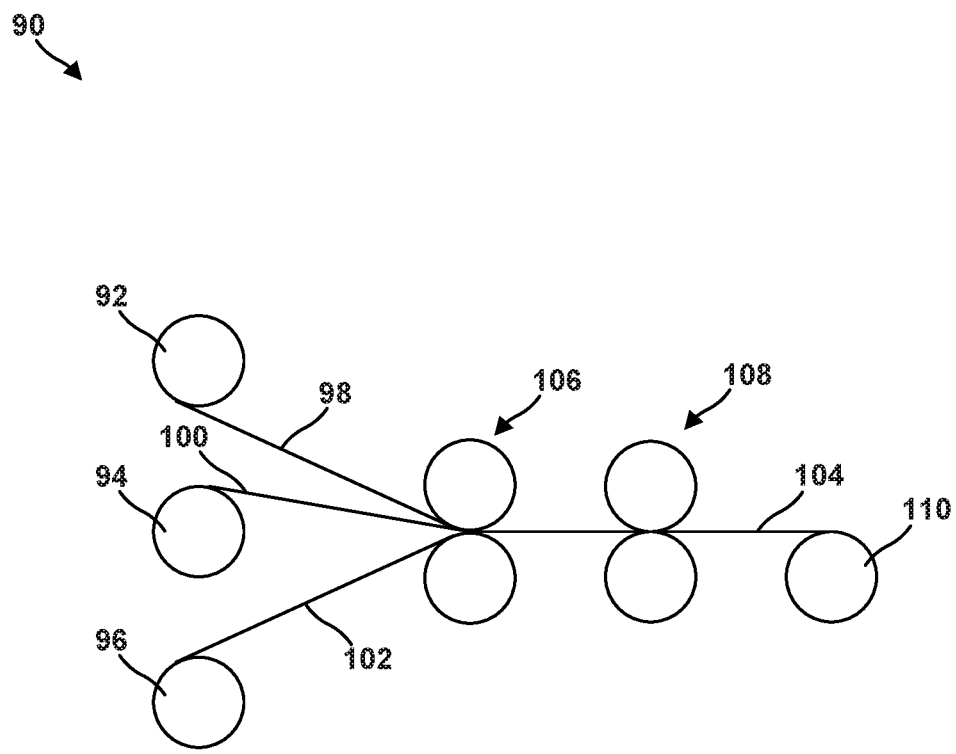
FIG. 4 is a conceptual diagram illustrating an example system for assembling a multilayer braze tape from multiple tapes.

In some examples, regardless if slurry, gel, or tape casting is used, each layer may be formed separately (e.g., as shown in FIG. 3). The resulting layers then may be combined to form a multilayer braze tape 20 or 50. FIG. 4 is a conceptual diagram illustrating an example system 90 for assembling a multilayer braze 104 tape from multiple tapes 98, 100, and 102. As shown in FIG. 4, each tape 98, 100, and 102 is initially carried by a respective roller 92, 94, and 96. In some examples, tapes 98 and 102 may include a silicon-containing braze material, and tape 100 may include a reinforcement material.

The tapes 98, 100, and 102 are unwound from rollers 92, 94, and 96, and pass through a gap between a first set of forming rollers 106. The first set of forming rollers 106 may exert a pressure against tapes 98, 100, and 102. The tapes 98, 100, and 102 also may pass through a second set of forming rollers 106, which also may exert a pressure against tapes 98, 100, and 102. In some examples, the temperature of system 90, or at least the portion of system 90 near first set of forming rollers 106 and second set of forming rollers 108 may be maintained at a temperature above the brittle to ductal transition temperature for the silicon (e.g., silicon metal) or the silicon alloy in tapes 98 and 102. The first set of forming rollers 106 and the second set of forming rollers 108 thus may press tapes 98, 100, and 102 together to form multilayer braze tape 104. In some examples, multilayer braze tape 104 may be sufficiently flexible to be rolled on roller 110 without damage to multilayer braze tape 104.

In some examples, multilayer braze tape 104 may be subsequently cut or otherwise formed into different sizes or shapes, e.g., shapes substantially conforming to the geometry of the joint in which the piece of multilayer braze tape 104 is to be used. In some examples, a multilayer braze tape 104 may not be sufficiently flexible 104 to be manipulated into different shapes, and, instead, may be formed in a mold corresponding to the shape of the joint in which the piece of multilayer braze tape is to be used.

Figure 5:
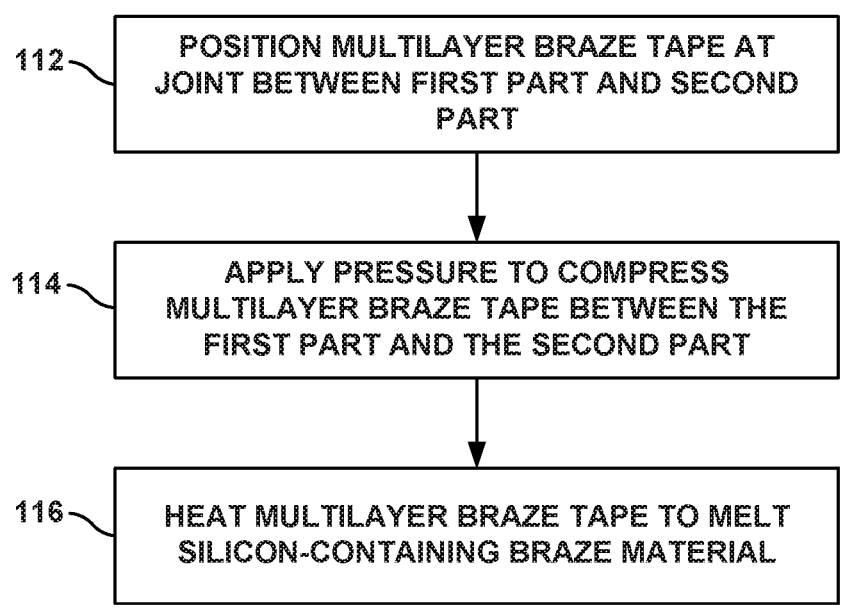
FIG. 5 is a flow diagram illustrating an example technique for joining a first part and a second part using a multilayer braze tape.

FIG. 5 is a flow diagram illustrating an example technique for joining a first part 12 and a second part 14 using a multilayer braze tape 20. The technique of FIG. 5 will be described with reference to the assembly 10 of FIG. 1 for ease of description, although the technique may be performed using a different assembly (e.g., assembly 40 of FIG. 2) or other multilayer braze tape (e.g., multilayer braze tape 50) in other examples.

The technique of FIG. 5 includes positioning multilayer braze tape 20 at the joint between first part 12 and second part 14 (112). For example, as shown in FIG. 1, first part 12 and second part 14 may be arranged to define a butt joint between joint surfaces 16 and 18, and multilayer braze tape 20 may be positioned between joint surfaces 16 and 18 (112). As described above, multilayer braze tape 20 may include at least one layer comprising a silicon-containing braze material (e.g., first and second layers 22) and at least one layer comprising a reinforcement material (e.g., third layer 24).

The technique of FIG. 5 also may include applying pressure to compress multilayer braze tape 20 between first part 12 and second part 12 (114). For example, as shown in FIG. 1, clamp 34 may be used to apply pressure to first part 12 and second part 14, which transmit the force to multilayer braze tape 20 and compress multilayer braze tape 20 between joint surfaces 16 and 18.

The technique of FIG. 3 additionally may include heating multilayer braze tape 20 to melt the silicon-containing braze material in first and second layers 22 and join the first part 12 and the second part 14 (116). Molten silicon-containing braze material may flow into third layer 24 and surround the reinforcement in third layer 24. Further, the molten silicon-containing braze material may react with carbon, e.g., from an organic binder system in first and second layers 22, third layer 24, or all the layers, to form silicon carbide. The silicon carbide may form a matrix phase around the reinforcement, and the matrix phase and the reinforcement together join first part 12 and second part 14.

Various examples have been described. These and other examples are within the scope of the following claims.

What is claimed is:

1. A method comprising:
   positioning a multilayer braze tape at a joint between a first part comprising a ceramic or ceramic matrix composite (CMC) and a second part comprising at least one of a ceramic, a CMC, a metal, or an alloy, wherein the joint is defined by a first joint surface of the first part and a second joint surface of the second part, and wherein the multilayer braze tape comprises:
   at least one layer comprising a silicon metal- or silicon alloy-containing braze material; and
   at least one layer comprising a reinforcement material;
   applying pressure to compress the multilayer braze tape between the first joint surface of the first part and the second joint surface of the second part; and
   heating the multilayer braze tape to melt the silicon metal or the silicon alloy in the silicon metal- or silicon alloy-containing braze material and join the first part and the second part without introducing molten material from outside the joint during the brazing technique.

2. The method of claim 1, wherein the multilayer braze tape comprises:
   a first layer comprising the silicon metal- or silicon alloy-containing braze material;
   a second layer comprising the silicon metal- or silicon alloy-containing braze material; and
   a third layer comprising the reinforcement material, wherein the third layer is between the first layer and the second layer.

3. The method of claim 1, wherein the reinforcement material comprise silicon carbide.

4. The method of claim 1, wherein the at least one layer comprising the reinforcement material further comprises at least one of graphite, carbon black, or diamond.

5. The method of claim 1, wherein the at least one layer comprising the silicon-containing braze material further comprises an organic binder system, wherein heating the multilayer braze tape to melt the silicon metal- or silicon alloy-containing braze material and join the first part and the second part releases carbon from the organic binder system, and wherein silicon from the silicon metal- or silicon alloy-containing braze material reacts with the carbon to form silicon carbide.

6. The method of claim 1, wherein the at least one layer comprising the silicon metal- or silicon alloy-containing braze material comprises at least one of silicon metal metal- or silicon alloy-containing particulates or silicon alloy-containing particulates.

7. The method of claim 1, further comprising:
   preheating at least one of the first part or the second part to a temperature between about 900° C. and about 1,000° C. prior to heating the multilayer braze tape to melt the silicon metal- or silicon alloy-containing braze material and join the first part and the second part.

8. The method claim 1, wherein:
   locally heating the multilayer braze tape to melt the silicon metal or silicon alloy in the silicon metal- or silicon alloy-containing braze material and join the first part and the second part comprises heating the multilayer braze tape to a temperature between about 1327° C. and about 1427° C.

9. An assembly comprising:
   a first part comprising a ceramic or ceramic matrix composite (CMC) and defining a first joint surface;
   a second part comprising at least one of a ceramic, a CMC, a metal, or an alloy and defining a second joint surface, wherein the second part is adjacent to the first part, wherein the first and second joint surfaces define a joint between adjacent portions of the first part and the second part;
   a multilayer braze tape positioned at the joint between the adjacent portions of the first part and the second part, wherein the multilayer braze tape comprises:
   at least one layer comprising a silicon metal- or silicon alloy-containing braze material; and
   at least one layer comprising a reinforcement material; and
   at least one braze heat source positioned and configured to locally heat the multilayer braze tape to a temperature between about 1327° C. and about 1427° C. to melt the silicon metal- or silicon alloy-containing braze material and join the first part and the second part, while not directly heating the first part and the second part.

10. The assembly of claim 9, wherein the multilayer braze tape comprises:
    a first layer comprising the silicon metal- or silicon alloy-containing braze material;
    a second layer comprising the silicon metal- or silicon alloy-containing braze material; and
    a third layer comprising the reinforcement material, wherein the third layer is between the first layer and the second layer.

11. The assembly of claim 9, wherein the reinforcement material comprises silicon carbide.

12. The assembly of claim 9, wherein the at least one layer comprising the reinforcement material further comprises at least one of graphite, carbon black, or diamond.

13. The assembly of claim 9, wherein the at least one layer comprising the silicon-containing braze material further comprises an organic binder system.

14. The assembly of claim 9, wherein the at least one layer comprising the silicon metal- or silicon alloy-containing braze material comprises at least one of silicon metal-containing particulates or silicon alloy-containing particulates.

* * * * *